United States Patent
Stenson et al.

(10) Patent No.: US 6,763,932 B2
(45) Date of Patent: Jul. 20, 2004

(54) PARTICULATE MATERIAL HANDLING SYSTEMS

(75) Inventors: Arthur Stenson, Saskatchewan (CA); Bret Watson, Saskatchewan (CA); Barclay Tanner, Saskatchewan (CA)

(73) Assignee: Batco Manufacturing Ltd., Saskatchewan (CA)

(*) Notice: Subject to any disclaimer, the term of this patent is extended or adjusted under 35 U.S.C. 154(b) by 0 days.

(21) Appl. No.: 10/388,875

(22) Filed: Mar. 14, 2003

(65) Prior Publication Data

US 2004/0000465 A1 Jan. 1, 2004

Related U.S. Application Data

(60) Provisional application No. 60/391,959, filed on Jun. 28, 2002.

(51) Int. Cl.[7] .............................................. B65G 33/00
(52) U.S. Cl. ................. 198/670; 198/550.5; 198/550.6; 198/620; 198/625; 198/671; 198/658; 198/550.8
(58) Field of Search ................................. 198/620, 625, 198/670, 671, 657, 550.5, 658, 550.6, 550.8

(56) References Cited

U.S. PATENT DOCUMENTS

| | | | | |
|---|---|---|---|---|
| 2,584,587 A | * | 2/1952 | Huyett | 451/83 |
| 2,890,787 A | | 6/1959 | Carter | 198/34 |
| 2,923,395 A | | 4/1960 | von Hofe | 198/31 |
| 3,012,650 A | | 12/1961 | Carter | 198/33 |
| 3,029,923 A | * | 4/1962 | Bilocq | 198/456 |
| 3,054,496 A | | 9/1962 | Carter | 198/33 |
| 3,771,298 A | | 11/1973 | Schmitt | 56/14.6 |
| 3,841,946 A | | 10/1974 | Carter | 156/566 |
| 4,120,535 A | | 10/1978 | Delli-Gatti, Jr. | 299/18 |
| 4,535,884 A | * | 8/1985 | Suppan | 198/626.2 |
| 5,052,545 A | | 10/1991 | Gongen | 198/534 |
| 5,407,057 A | * | 4/1995 | Baranowski | 198/448 |
| 5,735,386 A | | 4/1998 | Epp et al. | 198/550.01 |

FOREIGN PATENT DOCUMENTS

| | | | | |
|---|---|---|---|---|
| WO | 2002/0063039 A1 | * | 5/2002 | 198/662 |
| WO | 2002/0063040 A1 | * | 5/2002 | 198/662 |

OTHER PUBLICATIONS

Batco Manufacturing Brochure (12/01 BCL).

* cited by examiner

*Primary Examiner*—Richard Ridley
(74) *Attorney, Agent, or Firm*—Dinsmore & Shohl LLP

(57) ABSTRACT

The particulate material handling system comprises a tube, an endless belt that passes through the tube and returns outside of the tube, and a flighting that is suspended a predetermined distance from the belt through the entire length of the tube. The distance may be varied for the various materials being handled. An intake hopper is mounted at one end of the tube for receiving the material to be moved and a discharge spout is mounted at the other end of the tube for discharging the material from the tube. The endless belt and flighting are driven such that their speed may be varied and such that their relative speeds are synchronized to drive the material at substantially the same speed whether it is being carried by the belt or the flighting. The combination of the belt and the flighting drives the material through the tube, minimizing damage to the material, which may be granular fertilizer, pulse crops, grains or other particulate material.

36 Claims, 8 Drawing Sheets

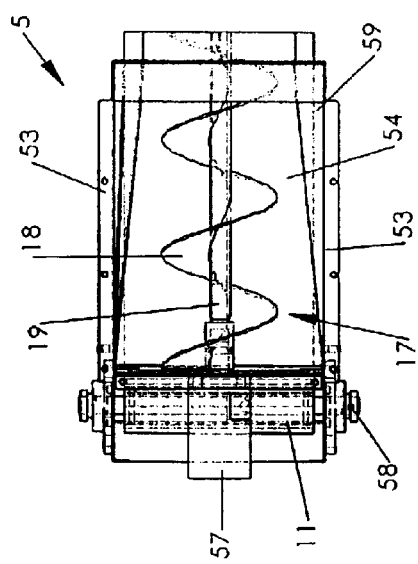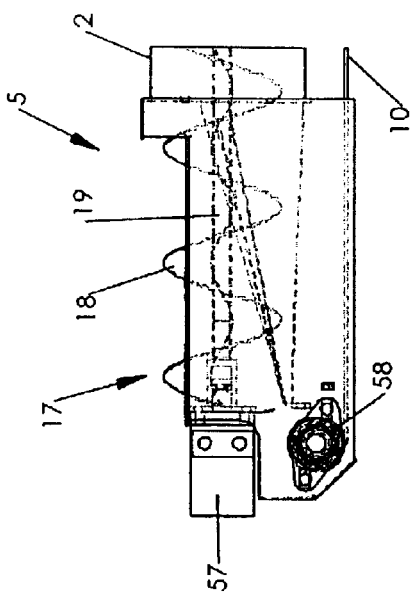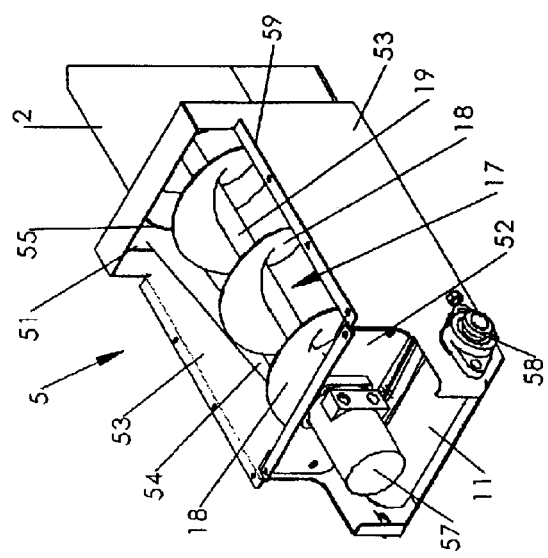

PARTICULATE MATERIAL HANDLING SYSTEMS

This application claims the benefit of U.S. Provisional Patent Application Serial No. 60/391,959 filed on Jun. 28, 2002.

FIELD OF THE INVENTION

The invention relates generally to material handling systems, and more particularly to belt conveyor/flighting handling systems.

BACKGROUND OF THE INVENTION

In the agricultural industry, systems for handling particulate materials such as grains and pulse crops as well as granular fertilizers have evolved over the years. Initially, standard augers were developed to move grains within and from threshers and combines as well to and from trucks to granaries and elevators. For their size, these auger systems are very efficient, being able to move large amounts of material at a relatively high speed. However, they also have the disadvantage of tending to grind the materials that they are moving, particularly where pulse crops, such as peas, are concerned. Crops that are damaged during movement have a lower quality grade and exhibit a poorer germination performance.

In order to diminish crop damage, belt conveyor systems are being used to a greater extent to move crops from one point to another. These conveyors have taken many forms such as flat endless belts with or without traversing ridges or paddles to keep the crop from flowing back down the belt particularly if the crop is being moved up an incline. To assist in containing the crop as it is being transported, belt conveyors have been developed wherein the endless belt is mounted within a cylindrical tube in such a manner that it conforms to at least the bottom inner surface of the tube to carry the crop through the tube. In this manner, the crops or other materials may be moved effectively with minimum damage. However, this type of belt conveyor system is restricted to shallow inclinations, i.e. in the order of 30 degrees, for moving materials. As the inclination of the conveyor increases from the horizontal, its capacity to move materials decreases. This results in the need for large conveyor systems and/or for exceptionally long conveyors for moving materials up to some desired elevation, which may be problematic where space is a factor.

Therefore, there is a need for an improved material handling system for minimizing damage to materials while being moved up an incline.

SUMMARY OF THE INVENTION

The invention is directed to a system for moving particulate material from a one location to another. The system comprises an endless belt, a mechanism for supporting the endless belt in such a manner that it takes on a substantially concave cross-section for cradling the particulate material as the endless belt means moves from the one location to the other and a flighting positioned a predetermined distance from the concaved belt along its length to drive the particulate material from the one location to the other as the flighting rotates.

For particulate materials such as granular fertilizer, pulse crops or grain, the speed at which the flighting and the belt are driven is controlled such that both move the material at approximately the same speed along the length of the system.

In accordance with another aspect of the invention, the material handling system comprises a tube structure having a first end and a second end, an endless belt running through the tube from the first end to the second end and outside the tube from the second end to the first end, wherein the belt substantially conforms to the inner surface of the tube. The system further includes a flighting structure positioned within the tube a predetermined distance from the belt, whereby the belt is adapted to be driven through the tube from the first end to the second end and the flighting is adapted to be rotated such that both move the particulate material through the tube from the first end and out of the second end.

In accordance with a further aspect of the invention, the system includes an intake mounted at the first end of the tube for receiving the particulate material. The intake includes mechanisms for supporting the endless belt and one end of the flighting.

In accordance with another aspect of the invention, the system includes a discharge mounted at the second end of the tube for discharging the particulate material. The discharge includes mechanisms for supporting the endless belt and a second end of the flighting.

In accordance with a further aspect of the invention, the system comprises a mechanism, which may be controlled to drive the belt and the flighting at predetermined relative speeds and at variable speeds. The drive mechanism may include motive power obtained from a power take-off (PTO) or hydraulic, electric or internal combustion motors. The belt and the flighting can be driven individually and may be synchronized.

In accordance with another aspect of the invention, a material handling system comprises a tube having a first end and a second end, an intake mounted at the first end of the tube, a discharge mounted at the second end of the tube, an endless belt, which runs from the intake through the tube to the discharge and back outside the tube to the intake, such that it conforms substantially to the inner surface of the tube, and a flighting positioned within the tube a predetermined distance from the belt, wherein the belt and the flighting are adapted to move particulate material through the tube from the intake to the discharge. The particulate material may be granular fertilizer, pulse crops, grain or other particulate material.

In accordance with a specific aspect of the invention, the tube is rigid and substantially circular, and comprises one or more sections. The intake has a front wall adjacent to the tube, a back wall, two side walls and a bottom, wherein the front wall has an opening to the tube, the back wall has a bearing structure for supporting the flighting and the bottom is shaped to be substantially flat near the back wall and substantially semicircular near the front wall. The intake further includes a roller mounted between the two sidewalls below the bottom to receive the endless belt. The discharge has a front wall adjacent to the tube, a back wall, two side walls and a bottom, wherein the front wall has an opening to the tube, the back wall has a bearing structure for supporting the flighting and the bottom is shaped to be substantially flat near the back wall and substantially semi-circular near the front wall. The discharge further includes a roller mounted between the two sidewalls below the bottom to receive the endless belt. The rollers may be adjustably mounted in the intake and/or discharge to permit the tensioning of the belt, or an s-drive mechanism may be mounted on the system to tension the belt.

In accordance with a further specific aspect of the invention, the belt has a smooth inner surface and an irregular outer surface. The flighting comprises one or more flighting sections positioned end to end, each comprising a screw type auger of helical construction fixed to a shaft. The flighting sections may also have support mechanisms along the length of the tube.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein:

FIG. 4 illustrates a perspective view of an example of an intake for the material handling system;

FIG. 5 is a top view of the material handling system intake shown in FIG. 4;

FIG. 6 is a side view of the material handling system intake shown in FIG. 4;

DETAILED DESCRIPTION OF THE INVENTION

Figure 1:
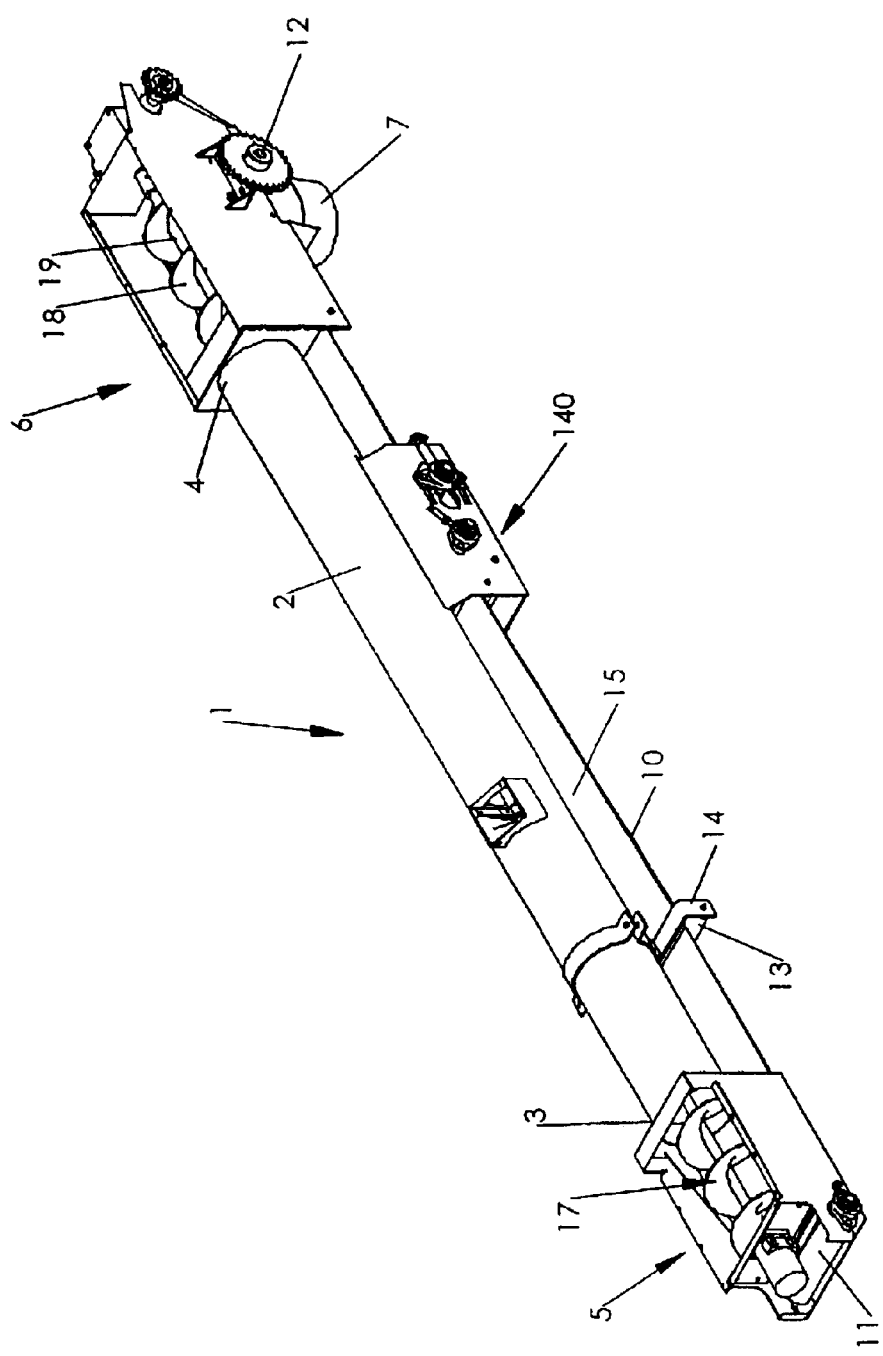
FIG. 1 is a perspective view of a material handling system in accordance with the present invention
Figure 2:
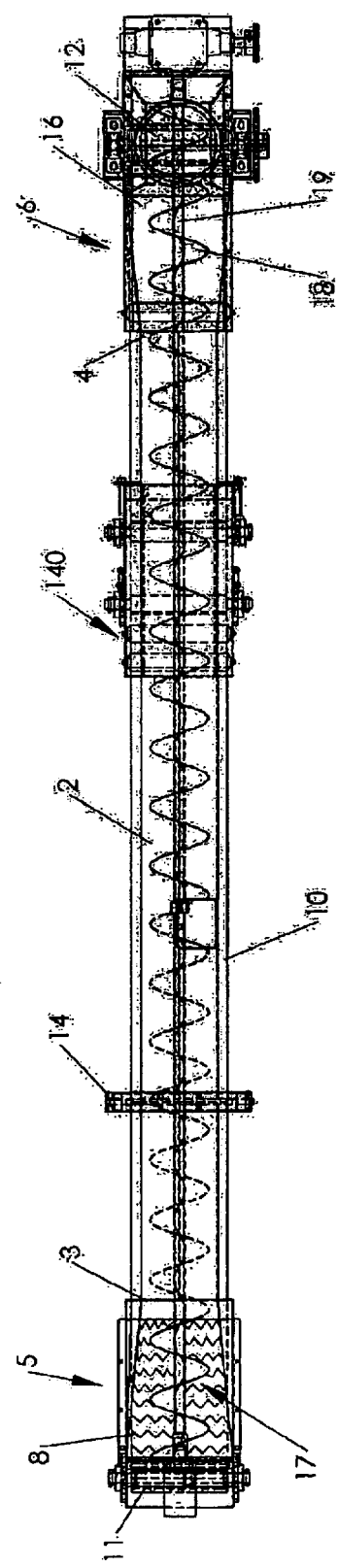
FIG. 2 is a top view of the material handling system shown in FIG. 1.
Figure 3:
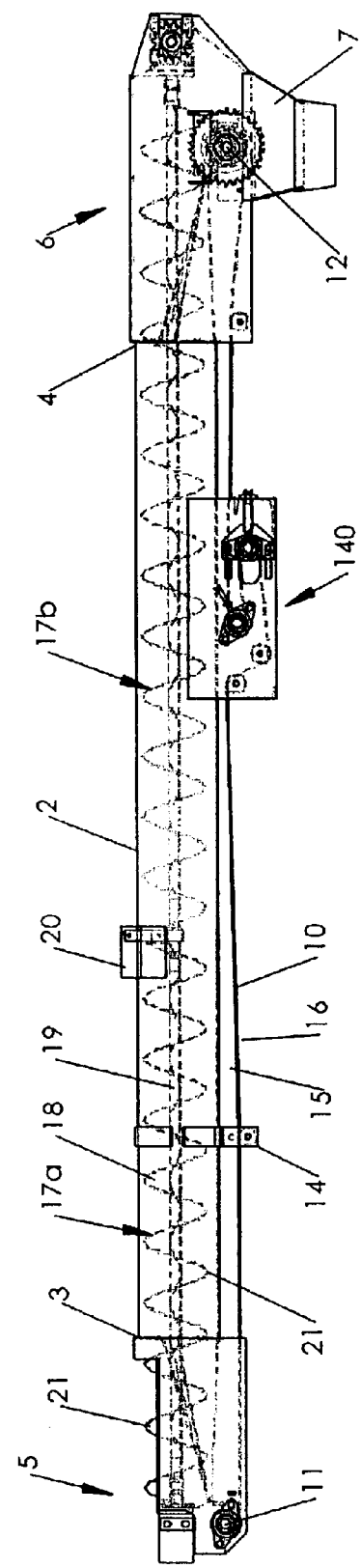
FIG. 3 is a side view of the material handling system shown in FIG. 1.

One embodiment of a material handling system 1 in accordance with the present invention is shown in FIGS. 1 to 3. The system 1 generally comprises a tube structure 2 with a first end 3 and a second end 4. The tube 2, which is made from a metal or other rigid material, has a smooth inner surface and an inner cross-section that is substantially constant throughout its length. The tube 2 is preferably circular in cross-section; however, it may also be somewhat elliptical. The tube 2 may have a unitary construction or it may be assembled from two or more sections depending on the overall length of the system 1 desired. An intake 5, which will described in more detail with respect to FIGS. 4 to 6, generally has the shape of a hopper that is mounted on the first end 3 of the tube 2. A discharge 6, which may include a spout 7, is mounted on the second end of the tube 2; the discharge 6 will also be described further with respect to FIGS. 7 to 9.

The material handling system 1 further includes an endless belt 10, which is flexible both along its length and across its width. Belt 10 is mounted on rollers 11 and 12 at the first and second ends 3 and 4 respectively of the tube 2 such that the belt 10 runs through the tube 2 between the rollers 11 and 12 and returns on the outside of the tube 2 between rollers 12 and 11. As illustrated, the belt 10 run within the tube 2 conforms substantially to the shape of the tube 3 and covers a portion of the bottom inner surface of the tube structure 3 such that most of the particulate material being moved through the system 1 is not in direct contact with the tube 2. The width of the belt 10 may vary from one application to the next; for instance, the belt 10 may cover substantially the entire inner surface of the tube 2 or only a fraction of the inner surface, depending on the volume of particulate material moving through the tube 2. However, for most applications, it is preferred that the belt 10 cover approximately the bottom half of inner surface of the tube 3 to form a semi-circular shape in cross-section. As illustrated, tube 2 provides support for the belt 10 and causes the belt 10 to form a substantially concave cross-section for cradling the particulate material as the belt 10 moves from one end 3 to the other end 4. In the preferred embodiment, a tube 2 that is completely closed is used to prevent spillage and to assure structural integrity, however other support structures, such as an elongated trough that is open at the top along its length or even a series of arcuate supports, may be used as long as they properly support the belt 10.

The rollers 11 and 12 are generally cylindrical, and one or both of the rollers 11, 12 may be used to properly tension the belt 10. Alternately, an s-drive 140, as described with respect to FIGS. 14 to 16, may be used to tension the belt 10. The belt 10, returning from roller 12 to roller 11, would normally be flat conforming to the shape of cylindrical rollers 11, 12. Depending on the length of the tube 2, the belt 10 may be further supported by additional rollers 13, which are mounted by brackets 14 to the tube 2.

Belt 10 preferably has a slider back whereby it is finished with nylon or some other similar material, on its inner surface 15, to permit it to slide freely over the inside surface of the tube 10. The outer surface 16 of belt 10 may be provided with a rough irregular or patterned surface 8, to enhance the friction between it and the particulate material being moved.

Further, in accordance with the present invention, the material handling system 1 includes a flighting 17 that is mounted inside the tube structure 2 in such a manner that it is suspended above the belt 10 to avoid contact between the flighting 17 and the belt 10 throughout its length. Conventionally, the flighting 17 is a screw type auger 18 of helical construction fixed to a shaft 19. Depending on the length of the tube 2, one or more flighting sections 17a, 17b, . . . may be mounted within the tube 2 between flighting supports 20 to assure the stability of the flightings 17a, 17b, and to prevent edge 21 of the rotating auger 18 from striking the belt 10 or the interior surface of the tube 2. Details of the supports 20 will be described further with respect to FIGS. 10 to 12.

Both the belt 10 and the flighting 17 provide a forward motion to the material being transported through the tube 2, the result being that the grinding of the material by the flighting 17 is minimized, while maintaining a high capacity to move material up relatively sharp inclines. This system can be used with any type of particulate material, however it is particularly advantageous for the handling of grains and pulse crops that are sensitive to impact damage. The system 1 has many applications such as short runs for moving grain in combine equipment, for loading seeders, as drill fills, on seed carts and as stationary units. The systems 1 may also be implemented as long runs where the system is mounted on wheels with a fixed or a scissor lift. In the latter case, the system 1 may also include tension cables to support the ends of the tube.

The intake 5 illustrated in FIGS. 4 to 6 is attached to the first end 3 of the tube 2. The intake includes a front wall 51, a back wall 52, two sidewalls 53 and a bottom 54. The front wall 51 has a circular opening 55 with substantially the same circumference as the tube 2. In this particular embodiment, a motor 57, such as a hydraulic motor, is mounted on the back wall 52; the motor 57 has the dual function of supporting the shaft 19 of the flighting 17 as well as rotating the flighting 17. The motor 57 is mounted on the wall 52 either in such a manner that it is fixed in one position or, alternately, such that it may be adjusted vertically to vary the distance between the flighting 17 and the belt 10. In an alternate embodiment, where the flighting 17 is rotated from its other end, the flighting 17 shaft 19 may be supported by a bearing support fixed to wall 52 in a similar manner as that described with regard to the motor 57. A roller 11 is mounted between the walls 53 on bearings 58 in such a manner that it can be adjusted along the length of the intake 5 to tension the belt 10. When alternate belt tensioning methods are used, the roller 11 may still be adjustable for tracking purposes. The roller 11 may be mounted inside intake 5 in front of the back wall 52, however to prevent loss of material, it is preferably located outside of the intake 5 with the top of the roller 11 being at approximately the same level as the bottom 54 of the intake 5. The bottom 54 of the intake 5 is shaped such that it is flat at the roller 11 end of the intake 5 and is curved to form an approximate half cylinder at wall 51. In this way, the belt 10 will take the shape of the bottom 54 as the belt 10 moves towards the tube 2 where the belt 10 will conform to the circular shape of the tube 2 as it enters the tube 2. Wall 51 further includes a slot opening under the bottom 54 to allow the belt 10 to return to the roller 11. The roller 11 may be a free wheeling coasting roller or a hydraulic motor or other drive mechanism may be coupled to it to drive the belt 10.

Though the end of the flighting 17 is shown as penetrating the entire intake 5 substantially to the back wall 52, this need not be the case. The auger 18 of the flighting 17 may start at any point on the shaft 19 within the intake 5. The top edge of the intake 5 is shown as having a flange 59 to which may be attached an extended rigid or flexible hopper to facilitate the loading of the materials into the material handling system 1.

Figure 8:
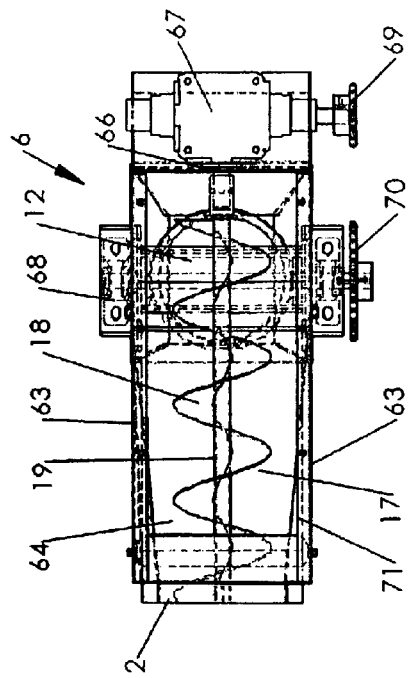
FIG. 8 is a top view of the material handling system discharge shown in FIG. 7.
Figure 9:
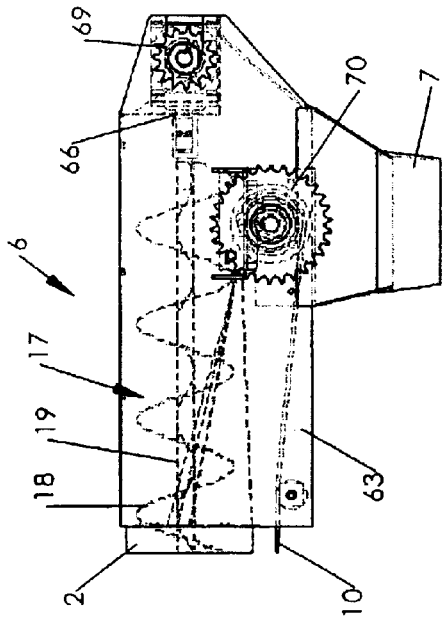
FIG. 9 is a side view of the material handling system discharge shown in FIG. 7.
Figure 7:
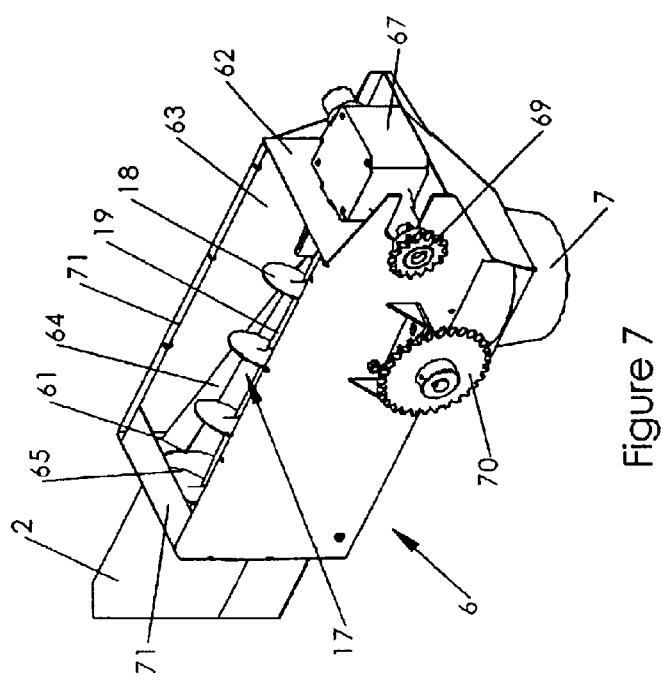
FIG. 7 illustrates a perspective view of an example of a discharge for the material handling system.

The discharge 6 illustrated in FIGS. 7 to 9 is attached to the second end 4 of the tube 2. The discharge 6 includes a front wall 61, a back wall 62, two sidewalls 63 and a bottom 64. The front wall 61 has a circular opening 65 having substantially the same circumference as the tube 2. Mounted within the back wall 62 is a bearing support 66 for the shaft 19 of the flighting 17. The bearing support 66 is mounted on the wall 62 in such a way that it is fixed in one position or alternately such that it may be adjusted vertically to vary the distance between the flighting 17 and the belt 10. In addition, as illustrated in this embodiment, a gearbox 67 may be mounted on the wall 62 and coupled to the shaft 19. The gearbox 67 may also be used to replace the bearing support 66 to support the flighting 17. Further, roller 12 is mounted between the walls 63 on bearings 68. The roller 12 is mounted inside discharge 6 in front of the back wall 62 with the top of the roller 12 being at approximately the same level as the bottom 64 of the discharge 6. The bottom 64 of the discharge is shaped such that it forms an approximate half cylinder at wall 61 and is flat at the roller 12 end of the discharge 6. In this way, the belt 10 will be taking the shape of the bottom 64 as it moves towards the roller 12. The roller 12 may be a free wheeling coasting roller or a motor may be coupled to it to drive the belt 10.

In FIG. 7, the gearbox 67 is shown as having a gear 69, which may be used for coupling to a motor to drive the flighting 17 as well as to chain drive a further gear 70 that is coupled to the roller 12 such that the flighting 17 and belt 10 are driven in synchronism; however, other methods may be used to synchronously drive the belt 10 and the flighting 17, such as direct gearing, a belt drive or other well known method. A spout 7 is further mounted on the discharge 6 such that the material transported by the system 1 and coming off of the belt 10 will drop out of the system 1 through the spout 7.

Though the end of the flight 17 is shown as penetrating the entire discharge 6 substantially to the back wall 62, this need not be the case. The auger 18 on the flight 17 may end anywhere within the discharge 6 and preferably at a location near the top of the roller 12. To prevent the loss of material from the system, a cover plate may be attached to the top of discharge 6 by flange 71.

Figure 11:
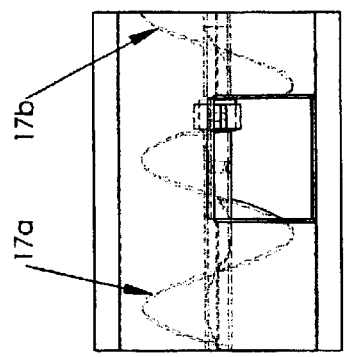
FIG. 11 is a top view of the material handling system flighting support shown in FIG. 10.
Figure 12:
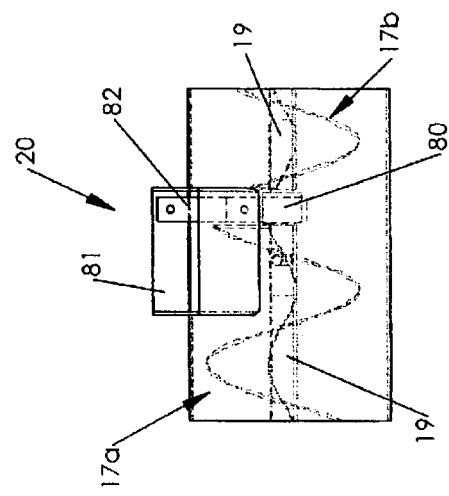
FIG. 12 is a side view of the material handling system flighting support shown in FIG. 10.
Figure 10:
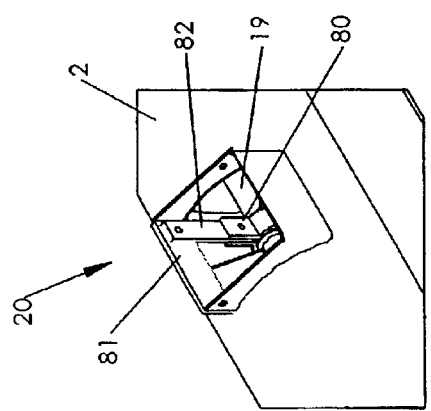
FIG. 10 illustrates a perspective view of an example of a flighting support in the material handling system.

The flighting support 20 shown in FIGS. 10 to 12 includes a bearing housing 80 into which the shafts 19 are coupled, a horizontal rod 81 which is fixed to the tube 2 and a vertical rod 82 that is fixed to the bearing housing 80 at one end and that is either fixed or adjustably connected to the horizontal rod 81 depending on the application of the system. In the latter case, the flightings 17a, 17b may be adjusted within the tube 2 in a direction perpendicular to the length of the tube 2 to vary the distance between the flighting 17 and the belt 10.

Though the use of hydraulic motors was described above with regard to FIGS. 4 to 9, other forms of motive power can be used, such as a tractor's power take-off (PTO) as well as conventional electric or internal combustion motors, to drive the endless belt 10 and the flighting 17 to transport a material through the tube 2 of the material handling system 1. In some applications, it is preferred to have the driving mechanism at the intake 5 particularly where a PTO is used or where it is desired to keep the hydraulic hoses as short as possible. In other applications, such as when the system 1 is being used with a cone bottom discharge granary, it is preferred to have the motor, electric or hydraulic mounted out of the way near the discharge 6. As examples, in the FIG. 4 embodiment, the motor is shown as being at the intake 5 end of the system, while in FIG. 7 embodiment, the belt and flighting 17 are shown as being driven at the discharge 6 end of the system 1.

In operation, the belt 10 and the flighting 17 are both activated before material is delivered to intake 5. The endless belt 10 is driven through the tube structure 2 from the first end 3 of the tube 2 to the second end 4 of the tube 2 and returns from the discharge 6 end of the tube 2 to the intake 5 end on the outside of the tube 2. Material delivered to the intake 5 is driven through the tubing structure 2 by the moving belt 10 and the rotating flighting 17 to the discharge 6. Substantial improvement in grade quality is noted for a crop being transported when both the belt 10 and the flighting 17 are moving the crop. However, it is preferred that the relative speed between the flighting 17 and the belt 10 be synchronized such that the crop is being driven at substantially the same speed whether it is being carried by the belt 10 or the flighting 17.

Figure 13:
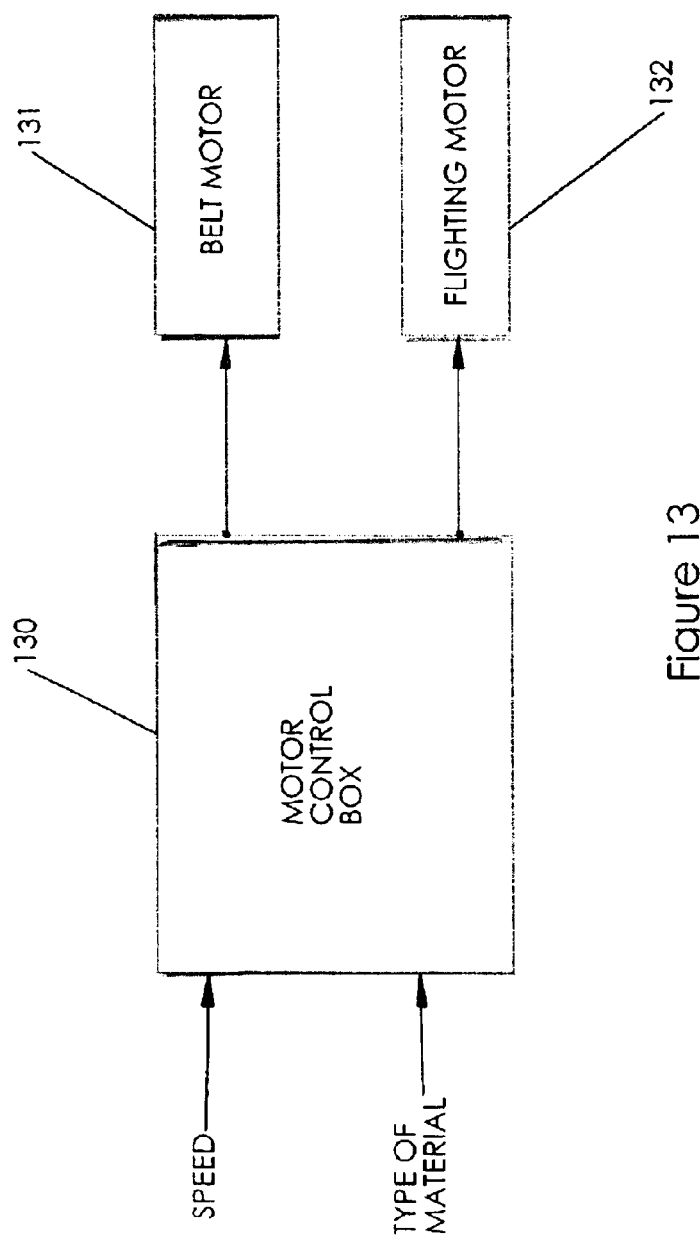
FIG. 13 is a schematic of a motor control system.

As illustrated in FIG. 7, one method of guaranteeing that the belt 10 and the flighting 17 will operate at the proper relative speeds is to select the proper gear ratio for fixed gears 69 and 70 that are driven by PTO, speed adjustable hydraulic, electric or internal combustion motor. Alternately, a control box 130, as illustrated schematically in FIG. 13, may be used to control the relative speeds of individual belt and flighting motors 131 and 132 respectively based on a first input identifying the type of material being handled and a second input for varying the overall speed of the system 1. In this way, the relative speeds of the belt 10 and flighting 17 can be optimized and the grinding of the crop between the flighting 17 and the belt 10 is minimized.

It has also been determined that, to transport different materials effectively and efficiently, it is desirable to adjust the speed of the belt 10 and the flighting 17 for different materials. In the embodiment described with regard to FIG. 13, this may be done by inputting the control box 130; while in the embodiment shown in FIG. 7, the speed adjustable motor may be controlled to achieve the ideal system speed for the application.

As described above with regard to FIGS. 4 to 12, the flighting 17 may be fixed or adjusted within the tube 2 to vary the distance of the edge 21 of the auger 18 from the belt 10. Since both the belt 10 and the flighting 17 are moving, very little material will be ground between the two, however to optimize the system 1, it may be desirable to adjust the spacing between the edge 21 and the belt 10 such that the spacing is greater than the maximum size of the materials being transported. In some applications, the system 1 will be used for a very specific particulate material such as in seeders, in these cases it may be preferably to have the flighting 17 fixed at a specific predetermined distance from the belt 10. In other applications, the system may be used for a variety of particulate materials, in these cases it may be preferable to have the flighting 17 adjustable to set the predetermined distances for the different materials in question.

Figure 15:
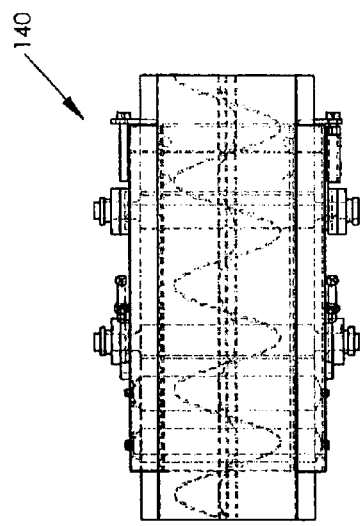
FIG. 15 is a top view of the s-drive shown in FIG. 14.
Figure 16:
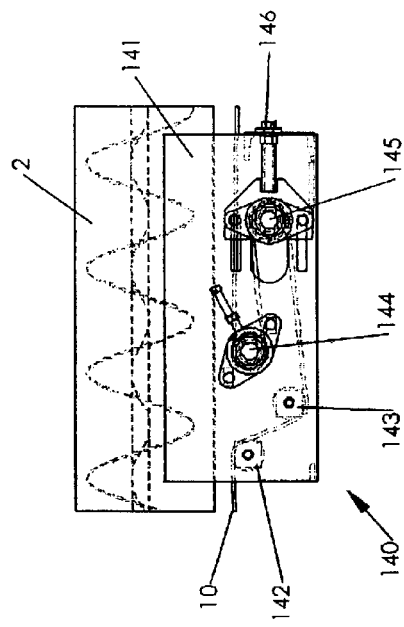
FIG. 16 is a side view of the s-drive shown in FIG. 14.
Figure 14:
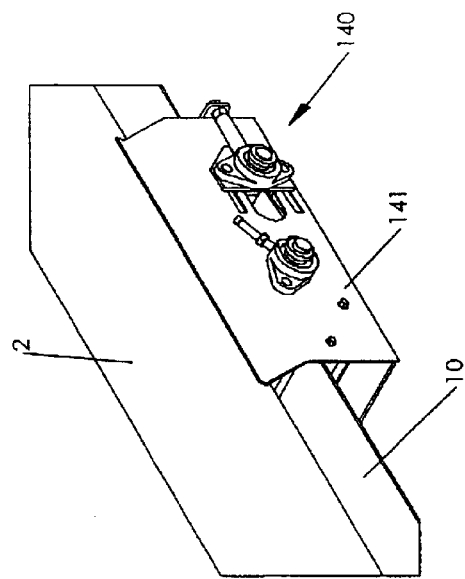
FIG. 14 illustrates a perspective view of an s-drive for tensioning the belt in the material handling system.

Rather then having rollers 11 and/or 12 adjustably mounting as shown in FIGS. 4 to 9 to tension the belt 10, a conventional s-drive 140 of the type illustrated in FIGS. 14 to 16 may be used. The s-drive 140 includes a structure 141 to fix the s-drive to the tube 2. Four rollers 142, 143, 144, and 145 are mounted within the structure 141 such that the belt 10 traces an s-pattern through the structure 141. Rollers 142 to 143 are generally fixed while the position of roller 145 is adjustable by a bolt 146 to vary the tension on the belt 10. In addition, in some embodiments, the s-drive 140 may be used to drive the belt 10 by connecting a motor to one of the rollers such as roller 144.

As seen from the above, an advantage of the system 1 in accordance with the present invention is its versatility in being capable of operating through a range of inclination angles from the horizontal while at the same time minimizing the damage caused to the materials being handled. The maximum operating angle of inclination surpasses the maximum angle of inclination of belt only tube conveyors for any given material while exhibiting a higher throughput capacity.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A material handling system comprising:
    a tube having a first end and a second end;
    an endless belt running through the tube from the first end to the second end, conforming substantially to the inner surface of the tube, and back outside the tube from the second end to the first end; and
    a flighting extending within the tube from the first end to the second end and positioned a predetermined distance from the belt; wherein the belt is adapted to be driven through the tube from the first end to the second end and the flighting is adapted to be rotated for moving particulate material by the belt and the flighting through the tube from the first end and out of the second end.

2. A material handling system as claimed in claim 1, which further includes an intake mounted at the first end of the tube for receiving the particulate material.

3. A material handling system as claimed in claim 2, which further includes:
    means for supporting the endless belt within the intake; and
    means for supporting a first end of the flighting within the intake.

4. A material handling system as claimed in claim 1, which further includes a discharge mounted at the second end of the tube for discharging the particulate material.

5. A material handling system as claimed in claim 4, which further includes:
    means for supporting the endless belt means within the discharge; and
    means for supporting a second end of the flighting within the discharge.

6. A material handling system as claimed in claim 1, which includes means for adjusting the predetermined distance between the belt and the flighting.

7. A material handling system as claimed in claim 1, which further includes means for driving the belt and the flighting.

8. A material handling system as claimed in claim 7 wherein the drive means includes means for driving the belt and for rotating the flighting at predetermined relative speeds.

9. A material handling system as claimed in claim 7, wherein the drive means includes means for driving the belt and for rotating the flighting at variable speeds.

10. A material handling system as claimed in claim 7, wherein the drive means includes motive means selected from a power take-off (PTO) and hydraulic, electric and internal combustion motors.

11. A material handling system as claimed in claim 7, wherein the drive means operates the belt and the flighting individually.

12. A material handling system as claimed in claim 7, wherein the drive means operates the belt and the flighting synchronously.

13. A material handling system as claimed in claim 1, wherein the particulate material is granular fertilizer, pulse crops or grain.

14. A material handling system comprising:
    a tube having a first end and a second end;
    an intake mounted at the first end of the tube;
    a discharge mounted at the second end of the tube;

an endless belt running from the intake through the tube to the discharge conforming substantially to the inner surface of the tube, and back outside the tube to the intake; and a flighting extending through the tube from the intake to the discharge and positioned a predetermined distance from the belt; wherein the belt and the flighting are adapted to move particulate material through the tube from the intake to the discharge.

15. A material handling system as claimed in claim 14, wherein the particulate material is granular fertilizer, pulse crops or grain.

16. A material handling system as claimed in claim 14, wherein the tube is rigid and substantially circular.

17. A material handling system as claimed in claim 16, wherein the tube comprises one or more sections.

18. A material handling system as claimed in claim 14, in which the intake has a front wall adjacent to the tube, a back wall, two side walls and a bottom, wherein the front wall has an opening to the tube, the back wall has a bearing structure for supporting the flighting and the bottom is shaped to be substantially flat near the back wall and substantially semicircular near the front wall.

19. A material handling system as claimed in claim 18, which further includes a roller adjustably mounted between the two sidewalls below the bottom to receive and apply tension to the endless belt.

20. A material handling system as claimed in claim 14, in which the discharge has a front wall adjacent to the tube, a back wall, two side walls and a bottom, wherein the front wall has an opening to the tube, the back wall has a bearing structure for supporting the flighting and the bottom is shaped to be substantially flat near the back wall and substantially semicircular near the front wall.

21. A material handling system as claimed in claim 20, which further includes a roller adjustably mounted between the two sidewalls below the bottom to receive and apply tension to the endless belt.

22. A material handling system as claimed in claim 14, wherein the belt has a smooth inner surface and an irregular outer surface.

23. A material handling system as claimed in claim 14, wherein the flighting comprises one flighting section.

24. A material handling system as claimed in claim 14, wherein the flighting comprises two or more flighting sections positioned end to end.

25. A material handling system as claimed in claim 24, which further includes flighting supports fixed to the tube to support the flighting sections.

26. A material handling system as claimed in claim 14, wherein the flighting comprises a screw type auger of helical construction fixed to a shaft.

27. A material handling system as claimed in claim 14, which includes means for driving the endless belt and for rotating the flighting.

28. A material handling system as claimed in claim 27, wherein the drive means includes gearing mass coupled to the belt and the flighting to drive them at a fixed relative speed.

29. A material handling system as claimed in claim 28, wherein the drive means includes motive means coupled to the gearing, wherein the motive means is selected from a power take-off (PTO) and hydraulic, electric and internal combustion motors.

30. A material handling system as claimed in claim 29, wherein the drive means includes means for controlling the speed of the motive means.

31. A material handling system as claimed in claim 27, wherein the drive means includes a first motor coupled to the belt and a second motor coupled to the flighting.

32. A material handling system as claimed in claim 31, wherein the drive means further includes control means for controlling the speed of the first motor and the second motor.

33. A material handling system as claimed in claim 32, wherein the control means has a first input for desired speed and a second input for type of particulate material.

34. A system for moving particulate material from one location to another comprising:

an endless belt adapted to carry the particulate material from the one location to the other;

means for supporting the belt and causing the endless belt to have a substantially concave cross-section for cradling the particulate material as the endless belt moves from the one location to the other; and flighting extending along the belt from the one location to the other, positioned a predetermined distance above the belt and adapted to rotate for driving the particulate material from the one location to the other in conjunction with the belt.

35. A system for moving particulate material as claimed in claim 34, which comprises means for controlling the endless belt and the flighting to move the particulate material at approximately the same speed along the system.

36. A system for moving particulate material as claimed in claim 35, wherein the particulate material is granular fertilizer, pulse crops or grain.

* * * * *

UNITED STATES PATENT AND TRADEMARK OFFICE
CERTIFICATE OF CORRECTION

PATENT NO. : 6,763,932 B2
DATED : July 20, 2004
INVENTOR(S) : Stenson et al.

It is certified that error appears in the above-identified patent and that said Letters Patent is hereby corrected as shown below:

Column 10,
Line 8, "gearing mass coupled" should read -- gearing coupled --

Signed and Sealed this

Seventh Day of December, 2004

JON W. DUDAS
*Director of the United States Patent and Trademark Office*